(12) United States Patent
Lindemann et al.

(10) Patent No.: US 10,487,885 B2
(45) Date of Patent: Nov. 26, 2019

(54) REDUCED DRAG CLUTCH PLATE

(71) Applicant: Schaeffler Technologies AG & Co. KG, Herzogenaurach (DE)

(72) Inventors: Patrick Lindemann, Wooster, OH (US); David Smith, Wadsworth, OH (US); Jeremiah Bauman, Orrville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/557,227

(22) PCT Filed: Mar. 9, 2016

(86) PCT No.: PCT/US2016/021516
§ 371 (c)(1),
(2) Date: Sep. 11, 2017

(87) PCT Pub. No.: WO2016/148999
PCT Pub. Date: Sep. 22, 2016

(65) Prior Publication Data
US 2018/0051754 A1  Feb. 22, 2018

Related U.S. Application Data

(60) Provisional application No. 62/132,652, filed on Mar. 13, 2015.

(51) Int. Cl.
*F16D 13/64* (2006.01)
*F16D 13/69* (2006.01)

(52) U.S. Cl.
CPC .......... *F16D 13/648* (2013.01); *F16D 13/64* (2013.01); *F16D 13/69* (2013.01)

(58) Field of Classification Search
CPC ........ F16D 13/69; F16D 13/64; F16D 13/648; F16D 13/68; F16D 13/683;
(Continued)

(56) References Cited

U.S. PATENT DOCUMENTS 1,810,360 A * 6/1931 Loeffler .................. F16D 13/64
192/107 C
2,653,692 A * 9/1953 Polomski, Jr. .......... F16D 13/64
192/107 R
(Continued)

FOREIGN PATENT DOCUMENTS

CN        103429923 A      12/2013
DE    102008062643 A1 *   6/2010  ........... F16D 13/648
(Continued)

OTHER PUBLICATIONS

International Search Report and Opinion for PCT/US2016/021516; 11 pgs; dated Jun. 17, 2016 by Korean Intellectual Property Office.

*Primary Examiner* — Jacob S. Scott
*Assistant Examiner* — James J Taylor, II
(74) *Attorney, Agent, or Firm* — LeKeisha M. Suggs

(57) ABSTRACT

A clutch plate includes an annular body having inner and outer diameters and first and second parallel surfaces extending therebetween; and an integral resilient portion connected to the annular body by a first circumferentially extending tab and including third and fourth parallel surfaces extending at respective acute angles to the first and second parallel surfaces; and, wherein the resilient portion fourth surface includes an edge including the outer diameter; and an axial distance of the edge is greater than a thickness of the annular body when measured from the first surface.

9 Claims, 4 Drawing Sheets

(58) Field of Classification Search
CPC ............ F16D 2013/642; F16D 25/062; F16D 25/063; F16D 25/0635; F16D 25/0638
See application file for complete search history.

(56) References Cited

U.S. PATENT DOCUMENTS

| | | | |
|---|---|---|---|
| 4,113,078 A | 9/1978 | Maycock | |
| 4,676,356 A * | 6/1987 | Beccaris | F16D 13/56 |
| | | | 192/111.16 |
| 9,103,386 B2 * | 8/2015 | Lindemann | F16D 13/64 |
| 9,841,064 B2 * | 12/2017 | Smith | F16D 13/648 |
| 2004/0065521 A1 * | 4/2004 | Watanabe | F16D 13/648 |
| | | | 192/70.14 |
| 2009/0211830 A1 * | 8/2009 | Kato | B60K 23/08 |
| | | | 180/244 |
| 2011/0000758 A1 | 1/2011 | Steinberger et al. | |
| 2014/0054125 A1 * | 2/2014 | Diemen | F16D 13/52 |
| | | | 192/70.2 |
| 2014/0291107 A1 * | 10/2014 | Lister | F16D 13/648 |
| | | | 192/107 R |
| 2014/0339045 A1 | 11/2014 | Lindemann | |
| 2016/0341258 A1 * | 11/2016 | Reisch | F16D 13/648 |
| 2018/0195561 A1 * | 7/2018 | Reisch | F16D 13/648 |

FOREIGN PATENT DOCUMENTS

| | | |
|---|---|---|
| JP | 10122258 A | 5/1998 |
| JP | 2012207775 A | 10/2012 |

* cited by examiner

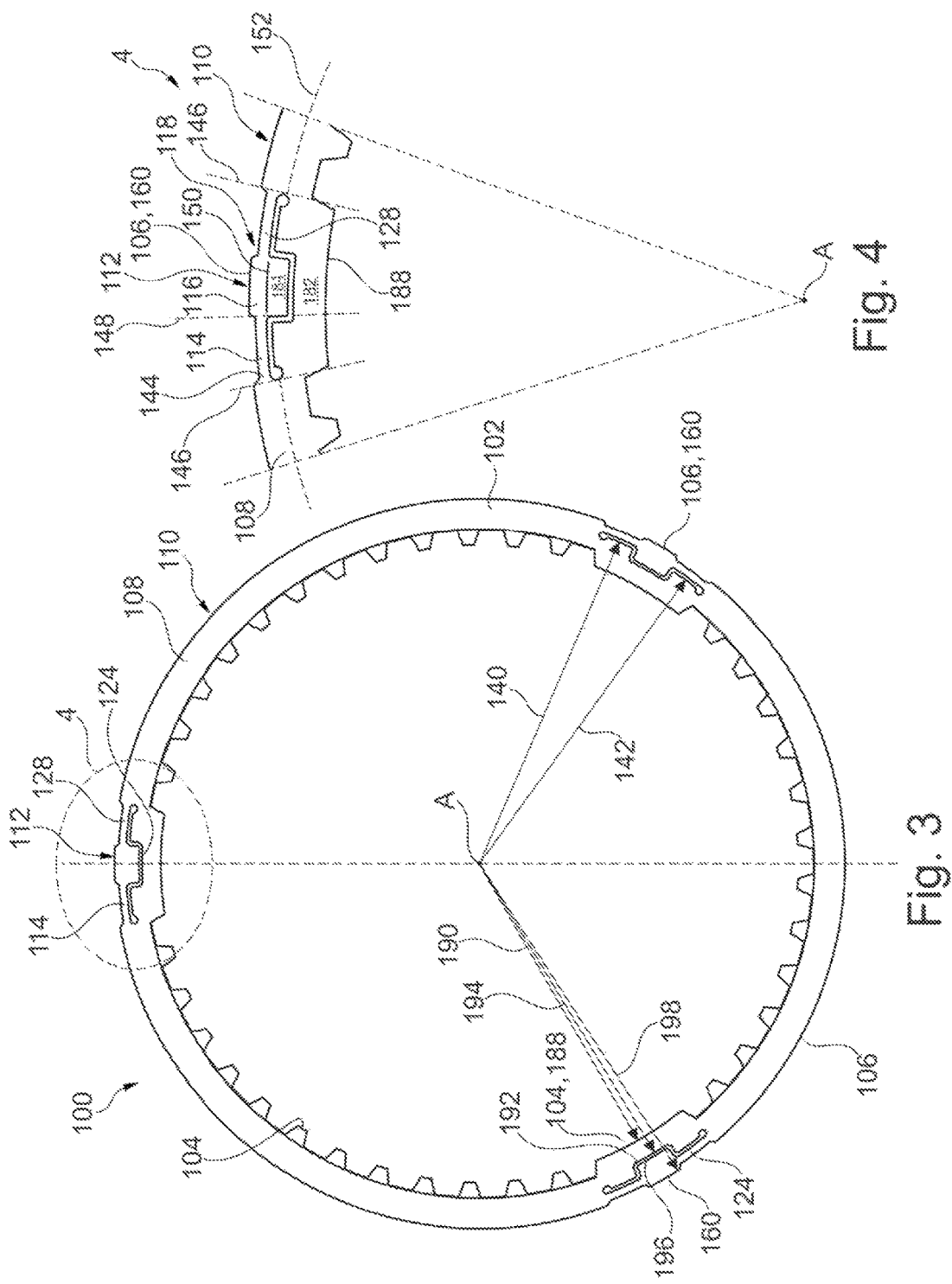

REDUCED DRAG CLUTCH PLATE

CROSS-REFERENCE TO RELATED APPLICATIONS

This application is the U.S. National Phase of PCT Appln. No. PCT/US2016/021516 filed Mar. 9, 2016, which claims priority to U.S. Provisional Application No. 62/132,652 filed Mar. 13, 2015, the entire disclosures of which are incorporated by reference herein.

FIELD

The invention relates generally to a clutch plate, and more specifically to a clutch plate with an integral drag reducing element.

BACKGROUND

Clutch plates are known. One example is shown in commonly-assigned United States patent application publication no. 2011/0000758 for a reduced drag clutch plate including a resilient drag reducing element with a formed portion disposed radially between friction ring inner and outer circumferences. Another example is shown in commonly-assigned United States patent application publication no. 2014/0339045 for a reduced drag clutch plate including an annular body and an integral resilient portion connected to the annular body by a first circumferentially extending tab.

BRIEF SUMMARY

Example aspects broadly comprise a clutch plate comprising: an annular body having inner and outer diameters and first and second parallel surfaces extending therebetween; and an integral resilient portion connected to the annular body by a first circumferentially extending tab and including third and fourth parallel surfaces extending at respective acute angles to the first and second parallel surfaces; and, wherein the resilient portion fourth surface includes an edge including the outer diameter; and an axial distance of the edge is greater than a thickness of the annular body when measured from the first surface. In an example aspect, the clutch plate further comprises a wet friction material affixed to the first and third surfaces. In an example aspect, the clutch plate further comprises a wet friction material affixed to the second and fourth surfaces. In an example aspect, the clutch plate further comprises a circumferential slot disposed radially between the inner and outer diameters, wherein the resilient portion is disposed radially between the outer diameter and the circumferential slot. In an example aspect, a clutch pack is provided comprising: first and second pressure plates; and, the clutch plate disposed therebetween. In an example aspect, the clutch pack includes one of the first or second pressure plates, or the clutch plate, including a radially outer spline for engaging a first clutch carrier; and, the other of the first or second pressure plates, or the clutch plate, including a radially inner spline for engaging a second clutch carrier. In an example aspect, the clutch pack includes wherein the resilient portion is arranged to be deflectable by the first and second pressure plates.

Other example aspects broadly comprise a clutch plate comprising: an annular body having inner and outer diameters and first and second parallel surfaces extending therebetween; and, a plurality of alternating first and second circumferential sections, each first circumferential section having a first portion including the first and second parallel surfaces, the outer diameter, and the inner diameter including a plurality of notches arranged to form spline teeth; each second circumferential section having a second portion including the first and second parallel surfaces and wherein the inner diameter is continuous and substantially devoid of notches; and a third portion, radially outward from the second portion and integral with the outer diameter, including third and fourth parallel surfaces, wherein the third and fourth parallel surfaces are not parallel to the first and second parallel surfaces. In an example aspect, the clutch plate includes wherein the third portion is an integral resilient portion connected to the annular body and including: first and second circumferentially extending tabs for connecting to the annular body; and, a resilient body portion disposed circumferentially between the first and second circumferentially extending tabs. In an example aspect, the clutch plate includes wherein the first section is of a first circumferential length and the second section is of a second circumferential length, wherein the first circumferential length is at least equal to the second circumferential length. In an example aspect, the clutch plate further comprises a wet friction material affixed to the first and third surfaces. In an example aspect, the clutch plate further comprises a wet friction material affixed to the second and fourth surfaces. In an example aspect, the clutch plate further comprises a circumferential slot disposed radially between the inner and outer diameters and disposed radially between the second portion and the third portion. In an example aspect, the clutch plate includes wherein the first and second parallel surfaces of the annular body include a thickness therebetween; and wherein the third portion includes first and second opposing corners having an axial width therebetween; and wherein the axial width is greater than the thickness. In an example aspect, the clutch plate includes wherein the outer diameter includes the second corner. In an example aspect, a clutch pack is provided comprising: first and second pressure plates; and, the clutch plate disposed therebetween. In an example aspect, the clutch pack includes wherein: one of the first or second pressure plates, or the clutch plate, includes a radially outer spline for engaging a first clutch carrier; and, the other of the first or second pressure plates, or the clutch plate, includes a radially inner spline for engaging a second clutch carrier. In an example aspect, the clutch pack includes wherein the third portion is arranged to be deflectable by the first and second pressure plates.

Other example aspects broadly comprise a clutch plate comprising: an axis of rotation; an annular body with inner and outer diameters and first and second parallel surfaces extending therebetween; an inner portion including: the first and second parallel surfaces; a continuous inner circumferential edge, connecting the first and second parallel surfaces, disposed at a first radial distance relative to the axis of rotation and; an upper circumferential edge disposed at a second radial distance relative to the axis of rotation, wherein the second radial distance is greater than the first radial distance; and, an outer portion including: third and fourth parallel surfaces, wherein the first and third surfaces are not parallel; a lower circumferential edge; an outer circumferential edge disposed at a third radial distance relative to the axis of rotation, where the third radial distance is greater than the second radial distance, and wherein the outer diameter is disposed at a radial distance equal to the third radial distance; and, a slot disposed between the upper edge and the lower edge. In an example aspect, the clutch plate includes wherein the outer portion further comprises first and second circumferentially extending tab portions arranged for connecting the third and fourth parallel surfaces to the first and second parallel surfaces, respectively.

BRIEF DESCRIPTION OF THE DRAWINGS

The nature and mode of operation of the present invention will now be more fully described in the following detailed description taken with the accompanying drawing figures, in which:

FIG. 3 is a front view of the clutch plate of FIG. 1 wherein the friction material is not shown;

FIG. 4 is a detail view of encircled region 4 in FIG. 3; and,

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Low drag torque clutch plates are desired. By integrating a resilient element into the clutch plate outer diameter, low drag torque is achieved in clutch plates having limited radial cross section while still maintaining the integrity of the plate under burst speeds. Further by at least partially eliminating spline teeth from the inner diameter of the clutch plate, a robust design under burst speed is ensured.

Figure 1:
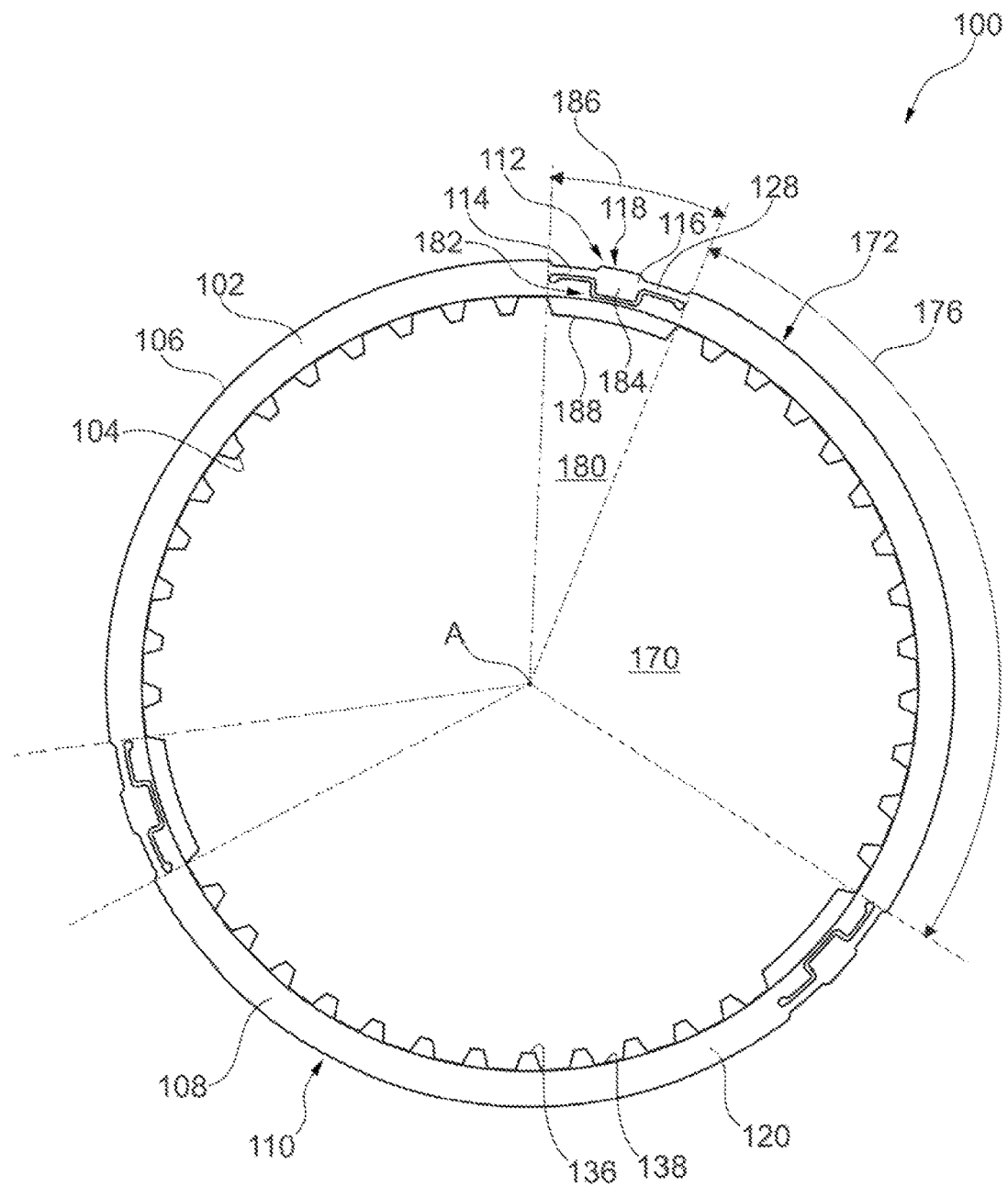
FIG. 1 is a front view of a clutch plate according to an example aspect.
Figure 2:
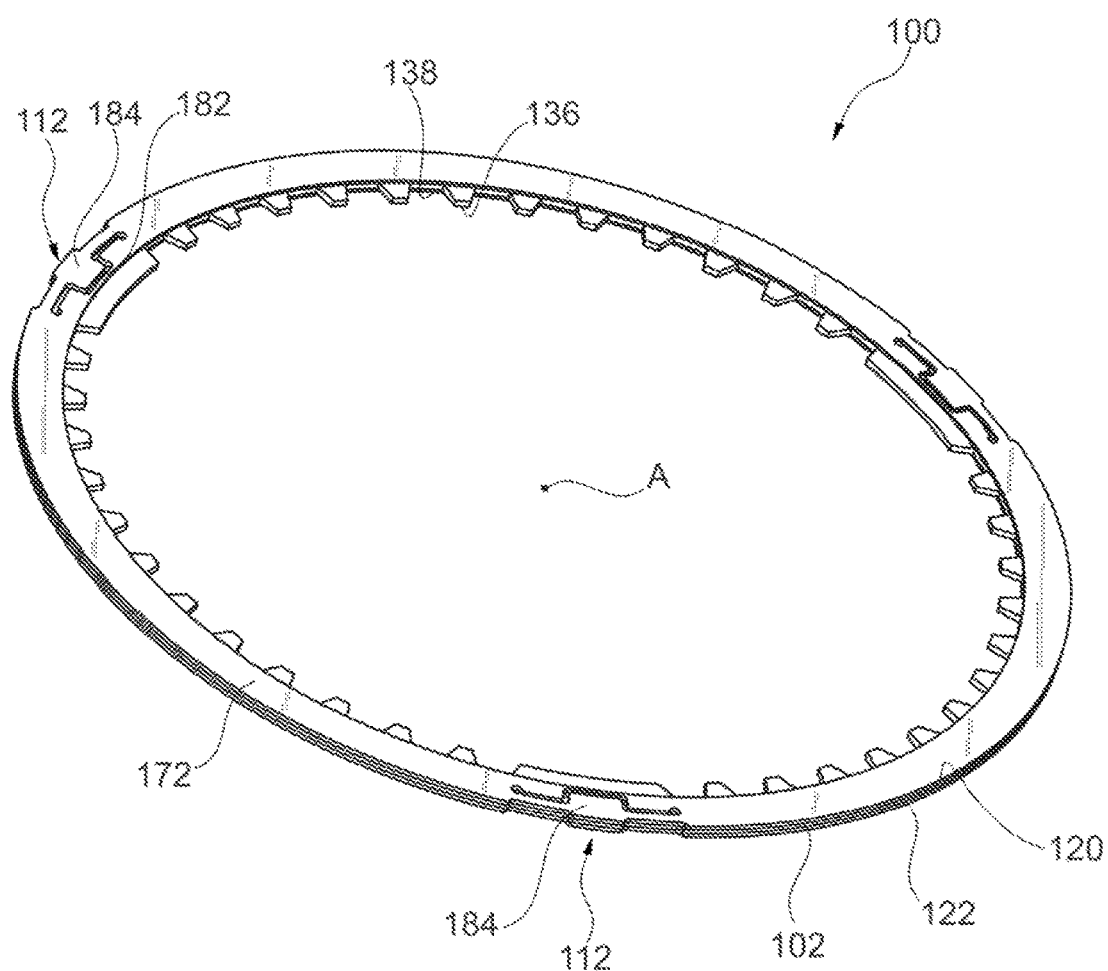
FIG. 2 is a perspective view of the clutch plate of FIG. 1.
Figure 5:
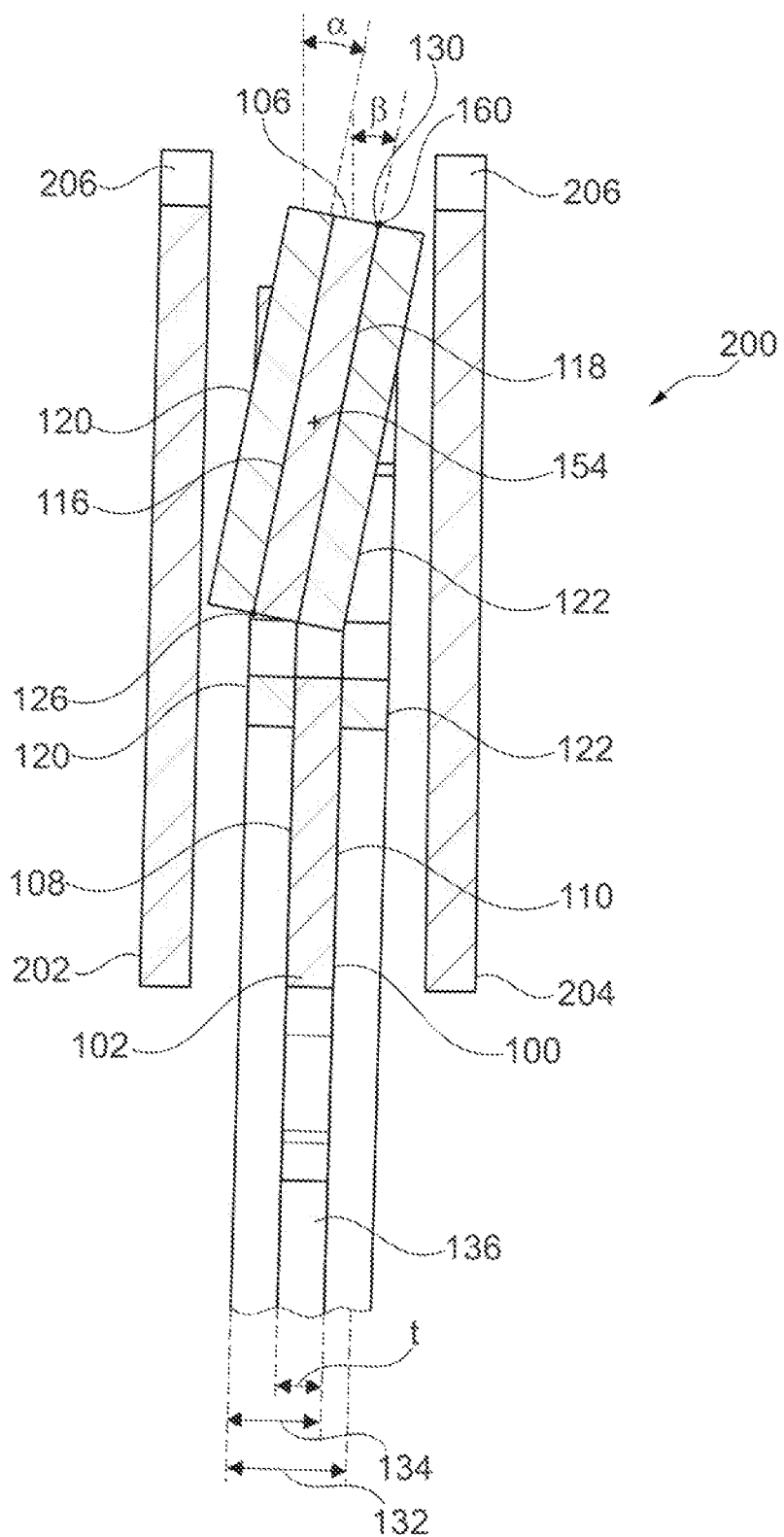
FIG. 5 is a cross sectional view of a clutch pack according to an example aspect.

The following description is made with reference to FIGS. 1-5. FIG. 1 is a front view of clutch plate 100 according to an example aspect. FIG. 2 is a perspective view of clutch plate 100 of FIG. 1. FIG. 3 is front view of clutch plate 100 of FIG. 1 wherein the friction material is not shown. FIG. 4 is a detail view of encircled region 4 in FIG. 3. FIG. 5 is a cross sectional view of a clutch pack according to an example aspect.

Clutch plate 100 includes annular body, or ring-shaped body portion, 102 with inner and outer diameters, 104 and 106, respectively, and respective parallel surfaces 108 and 110, extending therebetween. Outer diameter is the outermost diameter for examples in which the outer diameter is discontinuous; likewise inner diameter is the innermost diameter for examples in which the inner diameter is discontinuous. Clutch plate 100 also includes integral resilient portion 112 connected to annular body 102 by circumferentially extending tab 114. Integral means that the annular body and the resilient portion are formed from a single or the same piece of material. Resilient portion 112 is interchangeably referred to herein as body portion 112 integral resilient body portion, or simply as portion 112. Portion 112 includes respective parallel surfaces 116 and 118 extending at respective acute angles α and β to surfaces 108 and 110. Clutch plate 100 optionally includes wet friction material 120 affixed to surfaces 108 and 116, and friction material 122 affixed to surfaces 110 and 118. Although plate 100 is shown with friction material affixed to both sides, other embodiments may include friction material on only one side or have no friction material at all.

Clutch plate 100 includes circumferential slots 124 disposed radially inside with respect to circumferentially extending tab 114. The geometry of the slot is variable according to needs. Clutch plate 100 also includes circumferentially extending tab 128. As best seen in FIG. 4, resilient portion 112 is disposed circumferentially between circumferentially extending tabs 114 and 128. As best seen in FIG. 2, surface 116 includes first corner 126 and surface 118 includes second corner 130. Axial width 132 from first corner 126 to second corner 130 is greater than thickness t of body 102. Alternatively, axial distance 134 of first corner 126 is greater than thickness t of body 102 as measured from surface 110. Portion 112 is arranged to pivot or twist with respect to annular body 102 such that axial width 132 of first corner 126 is aligned with a plane formed by the annular surface 108. In other words, because portion 112 is formed of a same piece of material as body 102, portion 112 is pivotable to lie coplanar with the annular body such that the portion and the body form a flat surface. For example, portion 112 forms a flat surface with the body upon deflection and displacement when pressure is applied such as in a clutch pack.

As shown in FIG. 5, clutch pack 200 includes pressure plates 202 and 204, and clutch plate 100. Pressure plates 202 and 204 include radially outer spline 206 for engaging a clutch carrier (not shown) and clutch plate 100 includes radially inner spline 136 for engaging a clutch carrier (not shown) and notches 138. Portion 112 is arranged to be deflectable by the pressure plates 202 and 204. For example, portion 112 axially displaces the pressure plates away from the clutch plate to reduce viscous drag from an oil bath in which the clutch pack is installed when the pressure plates and the clutch plate are rotating at different speeds. But when the clutch is engaged and axial force is applied to the pressure plates to clamp the clutch plate, the resilient portion is easily deflected so that the pressure plates tightly clamp against the clutch plate friction material as in a conventional clutch plate.

Central axis A, or axis of rotation A, extends orthogonal to surface 108. Slot 124 extends from annular surface 108 through body portion 102 in a circumferential direction at varying radius 140 when measured from axis of rotation A. Tab or connector portion 114 is disposed radially between slot 124 and outer diameter 106 at a first circumferential position and pivotable portion 112 is disposed radially between slot 124 and outer diameter 106 at a second circumferential position, offset from the first circumferential position. Radial distances, or radii, 140 and 142 is closest together at the first circumferential position, and farthest apart at the second circumferential position. That is, a radial width of portion 114 is less than a radial width of pivotable portion 112.

Circumferentially extending tab 114 includes connector surface 144 with edge 146 shared with surface 108, and edge 148 shared with surface 116. Portion 112, and surfaces 116 and 118, are rotated relative to surface 108 about axis 150 tangent to circle 152 with a center point on axis of rotation A and passing through point 154 midway between surfaces 116 and 118. Although plate 100 is shown with three pivotable portions 112, other numbers are possible. Generally, at least two portions 112 are preferred.

In an example aspect, clutch plate 100 comprises annular body 102 having inner and outer diameters, 104 and 106 respectively, and first and second parallel surfaces, 108 and 110 respectively, extending therebetween. Integral resilient portion 112 is connected to annular body 102 by first circumferentially extending tab 114 and includes third and fourth parallel surfaces, 116 and 118 respectively, extending at respective acute angles α and β to first and second parallel surfaces 108 and 110. In an example aspect angles α and β are approximately the same or equal. Surface 118 of resilient portion 112 includes edge 160 including outer diameter 106. Axial distance 134 of edge 160 is greater than thickness t of annular body 102 when measured from first surface 108 as in the example in FIG. 5. More generally, depending upon the direction of the pivot, the resilient portion of one of the third or fourth surface includes an edge including the outer diameter; and an axial distance of the edge is greater than a thickness of the annular body when measured from the other of the first or second surfaces. In an example aspect, clutch plate 100 further comprises wet friction material 120 affixed to first 108 and third 116 surfaces. In an example aspect, clutch plate 100 optionally further comprises wet friction material 122 affixed to second 110 and fourth 118 surfaces. In an example aspect, clutch plate 100 further comprises circumferential slot 124 disposed radially between inner 104 and outer 106 diameters, wherein resilient portion 112 is disposed radially between outer diameter 106 and circumferential slot 124. In an example aspect, clutch plate 100 is useful in clutch pack 200 comprising clutch plate 100 and first 202 and second 204 pressure plates with clutch plate 100 disposed therebetween. In an example aspect, clutch pack 200 includes first or second pressure plates 202, 204 having radially outer spline 206 for engaging a first clutch carrier (not shown). In an example aspect, clutch plate 100 includes a radially inner spline 136 for engaging a second clutch carrier (not shown). Clutch pack 200 includes resilient portion 112 arranged to be deflectable by the first and/or second pressure plates 202, 204.

In example aspect, clutch plate 100 comprises, annular body 102 having inner and outer diameters 104, 106 and first and second parallel surfaces 108, 110 extending therebetween. Clutch plate 100 comprises a plurality of alternating first and second circumferential sections 170, 180. In an example aspect, each first circumferential section 170 having first portion 172 includes first and second parallel surfaces 108, 110, outer diameter 106, and inner diameter 104 including a plurality of notches 138 arranged to form spline teeth 136. In an example aspect, each second circumferential section 180 includes second and third portions 182, 184. In an example aspect, each second circumferential section 180 comprises second portion 182 including first and second parallel surfaces 108, 110 and wherein inner diameter 104 is continuous and substantially devoid of notches, and third portion 184, radially outward from second portion 182 and integral with outer diameter 106, including third and fourth parallel surfaces (116, 118), wherein third and fourth parallel surfaces 116, 118 are not parallel to the first and second parallel surfaces 108, 110. Second portion 182 is interchangeably referred to herein as inner portion, and third portion 184 is interchangeably referred to herein as outer portion. In an example aspect, third portion 184 of clutch plate 100 includes integral resilient portion 112 connected circumferentially to annular body 102 and further includes first and second circumferentially extending tabs 114, 128 for connecting to said annular body 102 in a circumferential direction. Resilient body portion 112 is disposed circumferentially between first and second circumferentially extending tabs 114, 128. In an example aspect, first section 170 is of first circumferential length 176 and second section 180 is of second circumferential length 186, wherein first circumferential length 176 is at least equal to second circumferential length 186. In another example aspect, first circumferential length 176 is greater than second circumferential length 186. In an example aspect, clutch plate 100 includes at least two first circumferential sections and at least two second circumferential sections. In a non-limiting example, three each of first and second circumferential sections are shown, as in FIG. 1, however, greater than three each first and second circumferential sections are contemplated. In an example aspect, clutch plate comprises wet friction material 120 affixed to first and third surfaces 108, 116. In an example aspect, clutch plate 100 optionally further comprises wet friction material 122 affixed to second and fourth surfaces 110, 118. In an example aspect, clutch plate 100 further comprises circumferential slot 124 disposed radially between inner and outer diameters 104, 106 and is disposed radially between second portion 182 and third portion 184. In an example aspect, first and second parallel surfaces 108, 110 of annular body 102 of clutch plate 100 include thickness t therebetween and third portion 184 includes first 126 and second 130 opposing corners having axial width 132 therebetween. In an example aspect, axial width 132 is greater than thickness t. In an example aspect, outer diameter 106 includes second corner 130.

In an example aspect, clutch plate 100 comprises axis of rotation A and annular body 102 having inner and outer diameters 104, 106 and first and second parallel surfaces 108, 110 extending therebetween, an inner portion and an outer portion. In an example aspect, inner portion 182 includes first and second parallel surfaces 108, 110 and continuous inner circumferential edge 188 connecting first and second parallel surfaces 108, 110, disposed at first radial distance 190 relative to axis of rotation A, and upper circumferential edge 192 disposed at second radial distance 194 relative to axis A, wherein second radial distance 194 is greater than first radial distance 190. In an example aspect, outer portion 184 includes third and fourth parallel surfaces 116, 118, wherein first 108 and third 116 surfaces are not parallel to each other. Outer portion 184 further includes lower circumferential edge 196 and outer circumferential edge 106, wherein outer circumferential edge is equal to outer diameter 106 and is disposed at third radial distance 198 relative to axis of rotation A. In an example aspect, the third radial distance 198 is greater than second radial distance 194. In other words, outer diameter 106 is disposed at a radial distance at most equal to third radial distance 198. Slot 124 is disposed between upper edge 192 and lower edge 196. The shape and size of slot 124 is variable. In an example aspect, outer portion 184 of clutch plate 100 includes first and second circumferentially extending tab portions 114, 128 arranged for connecting third and fourth parallel surfaces 116, 118 to first and second parallel surfaces 108, 110 of annular body 102 in a circumferential direction.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch plate comprising:
   an axis of rotation;
   an annular body with inner and outer diameters and first and second parallel surfaces extending therebetween;
   an inner portion including:
      the first and second parallel surfaces;
      a continuous inner circumferential surface, connecting the first and second parallel surfaces, disposed at a first radial distance relative to the axis of rotation and;
      an upper circumferential edge disposed at a second radial distance relative to the axis of rotation, wherein the second radial distance is greater than the first radial distance; and,
   an outer portion including:
      third and fourth parallel surfaces, wherein the first and third surfaces are not parallel;
      first and second circumferentially extending tab portions arranged for connecting the third and fourth parallel surfaces to the first and second parallel surfaces, respectively;
      a lower circumferential edge;
      an outer circumferential edge disposed at a third radial distance relative to the axis of rotation, where the third radial distance is greater than the second radial distance, and wherein the outer diameter is disposed at a radial distance equal to the third radial distance; and,
   a slot disposed between the upper edge and the lower edge.

2. A clutch plate comprising:
   an annular body having inner and outer diameters and first and second parallel surfaces extending therebetween; and,
   a plurality of alternating first and second circumferential sections,
      each first circumferential section having a first portion including the first and second parallel surfaces, the outer diameter, and the inner diameter including a plurality of notches arranged to form spline teeth;
      each second circumferential section having a second portion including the first and second parallel surfaces and wherein the inner diameter is substantially devoid of notches; and a third portion, radially outward from the second portion and integral with the outer diameter, including third and fourth parallel surfaces, wherein the third and fourth parallel surfaces are not parallel to the first and second parallel surfaces, and wherein the third portion is an integral resilient portion connected to the annular body and including:
         first and second circumferentially extending tabs for connecting to the annular body; and
         a resilient body portion disposed circumferentially between the first and second circumferentially extending tabs.

3. The clutch plate of claim 2 wherein the first section is of a first circumferential length and the second section is of a second circumferential length, wherein the first circumferential length is at least equal to the second circumferential length.

4. The clutch plate of claim 2 further comprising a wet friction material affixed to the first and third surfaces.

5. The clutch plate of claim 4 further comprising a wet friction material affixed to the second and fourth surfaces.

6. The clutch plate of claim 2 further comprising a circumferential slot disposed radially between the inner and outer diameters and disposed radially between the second portion and the third portion.

7. The clutch plate of claim 2 wherein the first and second parallel surfaces of the annular body include a thickness therebetween; and wherein the third portion includes first and second opposing corners having an axial width therebetween; and wherein the axial width is greater than the thickness.

8. The clutch plate of claim 7 wherein the outer diameter includes the second corner.

9. A clutch pack comprising:
   first and second pressure plates; and,
   the clutch plate of claim 2 disposed therebetween; wherein:
      one of the first or second pressure plates, or the clutch plate, includes a radially outer spline;
      the other of the first or second pressure plates, or the clutch plate, includes a radially inner spline; and,
      the third portion is arranged to be deflectable by the first and second pressure plates.

* * * * *